*Franklin & Clark,*
*Broom Hanger.*

No. 98,756. Patented Jan. 11, 1870.

Witnesses.
Chas. F. Brown.
Roger S. Adams.

Inventors.
Henry L. Franklin
Eugene Clark,
by Carroll D. Wright
Atty.

N. PETERS, PHOTO-LITHOGRAPHER, WASHINGTON, D.C.

United States Patent Office.

HENRY L. FRANKLIN AND EUGENE CLARK, OF NASHUA, NEW HAMPSHIRE.

Letters Patent No. 98,756, dated January 11, 1870.

IMPROVED HOLDER FOR BROOMS AND MOPS.

The Schedule referred to in these Letters Patent and making part of the same.

*To all whom it may concern:*

Be it known that we, HENRY L. FRANKLIN and EUGENE CLARK, of Nashua, in the county of Hillsborough, and State of New Hampshire, have invented an improved Broom or Mop-Holder, which we call "The Universal Broom or Mop-Holder;" and do hereby declare the following to be a full, clear, and exact description thereof, reference being had to the accompanying drawings, in which—

This invention is an improvement on our patent of September 14, 1869, No. 94,734, and consists, mainly, in substituting rubber or other elastic jaws or arms, for the metallic ones used in our previous patent.

The object of our invention is to provide a holder for brooms, &c., which can be easily fastened to the wall, and so constructed that the handle of the broom can be easily and quickly suspended in and firmly held by the holder, without indenting or otherwise injuring the wood, and in such manner that by lifting the handle thereof, it can be readily withdrawn from the holder.

A A' is a bracket, A' being the shelf-part, in which is the slot *a*.

B B are arms or clasps, of rubber, leather, or other like material, which are attached by the screws *b b*, between the lugs or projections C C.

The arms B are wedge-shaped, as shown. The wide ends are situated over the slot *a*, and are hollowed, as shown at D D, and, when not in use, rest on the shelf A'.

E represents the handle of a broom, or whatever may be desired to be held.

F F represent sharp points on the back of the bracket A.

Figure 1:
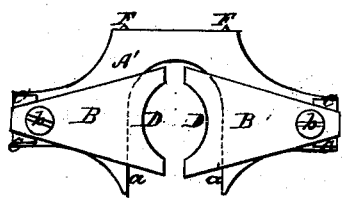
Figure 1 is a plan view of our invention.
Figure 2:
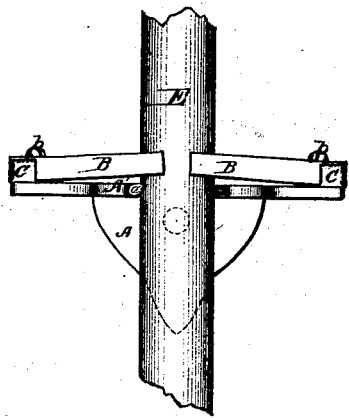
Figure 2 is a side elevation, with the handle of a broom or any other article held therein.

The operation of our invention is as follows:

The bracket is screwed up to the wall, in position shown in fig. 2. To suspend a broom, &c., push the end of the handle up through the slot *a*, opening, in its upward movement, the large ends of the arms B, and when the upward movement is stopped, of course the handle tends to a downward action, as also do the arms B, but the concave ends D D bite the handle, and keep the same suspended.

To remove the handle, lift it smartly, and with an upward and, at the same time, forward-drawing motion.

This device is very useful in the kitchen, but it is a great convenience in shops, barns, and tool-houses, for securely and neatly holding tools. It is not only cheap, but durable. The use of the rubber arms prevents the bruising of the handle suspended, and the device would save much time and expense, from the careless manner of handling and keeping tools.

Having thus fully described our invention,

What we claim as new, and desire to secure by Letters Patent, is—

The rubber arms, as shown at B B, in combination with bracket A, slotted at *a*, as constructed, and for the purpose set forth.

In testimony whereof, we have signed our names to this specification, in the presence of two subscribing witnesses.

HENRY L. FRANKLIN.
EUGENE CLARK.

Witnesses:
CARROLL D. WRIGHT,
CHARLES F. BROWN.